United States Patent
Hong et al.

(10) Patent No.: US 7,868,945 B2
(45) Date of Patent: Jan. 11, 2011

(54) FUNCTION KEY ASSEMBLY AND PORTABLE DEVICE HAVING THE SAME

(75) Inventors: Shin-hyeok Hong, Suwon-si (KR); Hyeong-sam Son, Suwon-si (KR); Kyoung-jin Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 11/648,620

(22) Filed: Jan. 3, 2007

(65) Prior Publication Data
US 2007/0268393 A1 Nov. 22, 2007

(30) Foreign Application Priority Data
May 9, 2006 (KR) .................. 10-2006-0041684

(51) Int. Cl.
*H04N 5/225* (2006.01)
*H04M 1/00* (2006.01)

(52) U.S. Cl. ............... 348/373; 348/376; 455/575.5

(58) Field of Classification Search ......... 348/373–376, 348/333.06, 333.07; 396/299, 373, 374; 200/18; 455/556.1, 556.2, 575.4, 575.3; D16/200, 211; D14/138 AC, 138 AD, 138 R
See application file for complete search history.

(56) References Cited

U.S. PATENT DOCUMENTS

| | | | | |
|---|---|---|---|---|
| 5,283,606 | A * | 2/1994 | Konno et al. ............... 396/299 |
| 5,703,947 | A | 12/1997 | Hino et al. | |
| 6,313,731 | B1 * | 11/2001 | Vance ..................... 338/185 |
| 6,385,398 | B1 * | 5/2002 | Matsumoto ................. 396/52 |
| 6,519,003 | B1 * | 2/2003 | Swayze ..................... 348/375 |
| 6,593,914 | B1 | 7/2003 | Nuovo et al. | |
| 6,636,264 | B1 * | 10/2003 | Nakao et al. ............... 348/375 |
| 6,683,653 | B1 * | 1/2004 | Miyake et al. ............. 348/373 |
| 6,794,982 | B2 * | 9/2004 | Inoue et al. ................. 338/47 |
| 7,054,551 | B2 * | 5/2006 | Liao et al. .................. 396/299 |
| 7,094,979 | B2 * | 8/2006 | Kurokawa et al. .......... 200/5 R |
| 7,297,883 | B2 * | 11/2007 | Rochon et al. ............. 200/5 R |
| 7,495,700 | B2 * | 2/2009 | Watanabe .................. 348/239 |
| 2001/0005229 | A1 * | 6/2001 | Misawa et al. ......... 348/333.01 |

(Continued)

OTHER PUBLICATIONS

European Search Report dated Sep. 28, 2007 issued in EP 07100395.8.

(Continued)

*Primary Examiner*—David L Ometz
*Assistant Examiner*—Richard Bemben
(74) *Attorney, Agent, or Firm*—Stanzione & Kim, LLP

(57) ABSTRACT

A function key assembly and a portable device having the same. The function key assembly is exposed to an outside of the portable device having a screen to allow a user to select various functions, includes a direction key unit provided in the portable device, and having a plurality of buttons to select or move a menu on the screen, a mode key unit movably provided around the direction key unit to allow the user to select a predetermined mode provided from the portable device according to a position motion thereof, and a circuit board provided inside the portable device to prevent the direction key unit and the mode key unit from being detached therefrom, and having switches to generate signals in response to an operation of the direction key unit and the mode key unit.

17 Claims, 9 Drawing Sheets

U.S. PATENT DOCUMENTS

| | | | |
|---|---|---|---|
| 2001/0023816 A1* | 9/2001 | Kuriyama | 200/6 A |
| 2002/0050919 A1* | 5/2002 | Vance | 338/47 |
| 2003/0135292 A1 | 7/2003 | Husgafvel | |
| 2004/0069601 A1* | 4/2004 | Gotoh | 200/17 R |
| 2004/0100511 A1* | 5/2004 | Wong et al. | 345/866 |
| 2004/0118670 A1 | 6/2004 | Park et al. | |
| 2004/0204202 A1* | 10/2004 | Shimamura et al. | 455/575.1 |
| 2005/0137000 A1 | 6/2005 | Toh et al. | |
| 2005/0190291 A1* | 9/2005 | Kota et al. | 348/376 |
| 2005/0202856 A1* | 9/2005 | Park et al. | 455/575.1 |
| 2006/0078324 A1* | 4/2006 | Yasuda et al. | 396/299 |
| 2006/0262183 A1* | 11/2006 | Bestie et al. | 348/14.01 |
| 2007/0273786 A1* | 11/2007 | Ahn et al. | 348/373 |

OTHER PUBLICATIONS

European Examination Report issued Sep. 16, 2010 in EP Application No. 07100395.8.

* cited by examiner

FUNCTION KEY ASSEMBLY AND PORTABLE DEVICE HAVING THE SAME

CROSS-REFERENCE TO RELATED APPLICATIONS

This application claims priority under 35 U.S.C. §119(a) of Korean Patent Application No. 2006-41684, filed on May 9, 2006, in the Korean Intellectual Property Office, the entire disclosure of which is hereby incorporated by reference.

BACKGROUND OF THE INVENTION

1. Field of the Invention

The present general inventive concept relates to a function key assembly and a portable device having the same.

2. Description of the Related Art

Recently, a multifunctional digital camera has been developed to have an image-taking function of a still image and a moving image, a voice recording function, an MP3 player function, and a WEB camera function. A digital camera has also been developed to have a DMB reception function.

The multifunctional digital camera is required to have various functions but should have a small size to allow users to carry it. The multifunctional digital camera is also required to have a large sized display screen in accordance with a DMB reception function.

Meanwhile, the multifunctional digital camera requires a plurality of function keys to select and manipulate various functions. In this respect, the multifunctional digital camera having a display screen and a plurality of function keys cannot constitute the display screen at a desired size of a consumer unless its whole size increases. Moreover, since the multifunctional digital camera requires a grip that allows a user to grasp the camera, the size of the display screen is more limited. Also, since the multifunctional digital camera requires a plurality of function keys corresponding to various functions, it is important to minimize the size increase occurring due to the function keys so that its whole size can be reduced.

SUMMARY OF THE INVENTION

The present invention provides a function key assembly and a portable device having the same, in which various functions can be performed with a simple and compact structure.

Additional aspects and advantages of the present general inventive concept will be set forth in part in the description which follows and, in part, will be obvious from the description, or may be learned by practice of the general inventive concept.

The foregoing and other aspects and advantages of the present general inventive concept may be achieved by providing a function key assembly usable with a portable device, to be exposed to an outside of the portable device having a screen to allow a user to select various functions and to include a direction key unit provided in the portable device and having a plurality of buttons to select or move a menu on the screen, a mode key unit movably provided around the direction key unit to allow the user to select a predetermined mode provided from the portable device in accordance with position motion, and a circuit board provided inside the portable device to prevent the direction key unit and the mode key unit from being detached therefrom, having switches to generate signals in response to an operation of the direction key unit and the mode key unit.

The portable device may include a main body having the screen, and a sub body provided to relatively slide the main body therein to support the direction key unit and the mode key unit, the direction key unit may be completely covered or exposed by the main body in accordance with a sliding position of the main body to allow the user to selectively manipulate the direction key unit, and the mode key unit may be exposed to allow the user to manipulate the mode key unit even in a state that the direction key unit is covered by the main body.

The direction key unit may include an enter button provided in the sub body at a height corresponding to a surface of the portable device and selected by a push operation, and a four directional button having a hollow to arrange the enter button at the center and provided in the portable device to allow the user to select different functions in four directions.

The mode key unit may include a ring member for mode selection, to support the direction key unit to prevent the direction key unit from being detached toward the outside of the portable device, to be reciprocated at a predetermined angle on the portable device around the direction key unit, and to allow the user to select a predetermined mode in accordance with rotation position, and a spring having both ends provided to selectively interfere with the portable device and the ring member to automatically restore the ring member to its original position.

The ring member may include a ring portion having a hollow and an edge, the hollow receiving the direction key unit at the center and the edge preventing the direction key unit from being rotated, a manipulation lever extended from an outside of the ring portion to a side of the portable device and exposed regardless of the sliding position of the main body, a guide portion provided in a rim of the ring portion to guide rotation of the ring portion, to restrict a rotational angle, and a protrusion protruding from the rim of the ring portion to interfere with both ends of the spring.

The foregoing and/or other aspects of the present general inventive concept may also be achieved by providing a portable device including a portable device body having a screen, and a function key assembly exposed to an outside of the portable device body to allow a user to select various functions, wherein the function key assembly includes a direction key unit provided in the portable device and having a plurality of buttons to select or move a menu on the screen, a mode key unit movably provided around the direction key unit, to allow the user to select a predetermined mode provided from the portable device in accordance with position motion, and a circuit board provided inside the portable device to prevent the direction key unit and the mode key unit from being detached therefrom, having switches to generate signals in response to an operation of the direction key unit and the mode key unit.

The portable device body may include a main body having the screen, and a sub body provided to relatively slide the main body therein and provided with the function key assembly.

The foregoing and/or other aspects of the present general inventive concepts may also be achieved by providing a function key assembly usable in a portable device, the function key assembly including a directional key unit having a plurality of buttons to control a menu displayed in a screen of the portable device, a mode key unit having a ring member to accommodate the directional key unit therein and to relatively move about the directional key unit, a switch interference portion formed on the ring member, and an elastic member disposed to bias the ring member between an original position and a moved position, and a switch disposed in the switch interference portion to generate one or more mode signals according to a movement of the switch interference portion of the ring member of the mode key unit.

The foregoing and/or other aspects of the present general inventive concepts may also be achieved by providing a function key assembly usable in a portable device, the function key assembly including direction key unit having a four direction button and an outer button disposed inside the four direction button, to control a menu screen, and a mode key unit having a ring member, a hollow formed on an inside of the ring member to receive the direction key unit, and a switch interference portion formed on an outside of the ring member, and a switch to generate one or more mode signals according to a movement of the switch interference portion.

The foregoing and/or other aspects of the present general inventive concepts may also be achieved by providing a function key assembly usable in a portable device, the function key assembly including a directional key unit having a plurality of buttons to control a menu screen of the portable device and to be covered and exposed by a main body of the portable device, and a mode key unit having a ring member disposed to relatively move with respect to the direction key unit to activate an external switch to control a mode of the portable device, and to be covered and exposed by the main body, and a portion formed on the ring member not to be covered by the main body to control the mode of the portable device.

The foregoing and/or other aspects of the present general inventive concepts may also be achieved by providing a portable device including a main body having a screen, a sub body disposed to relatively move with respect to the main body between a first position and a second position, and a function key assembly formed on the sub body, and having a direction key unit to control a menu displayed on the screen and to be covered in the first position and exposed in the second position, and a mode key unit having a ring member disposed to relatively move with the direction key unit to activate an external switch and to be disposed covered in the first position and exposed in the second position, and a position formed on the ring member not to be covered in the first position to control the external switch to control of a mode thereof.

The foregoing and/or other aspects of the present general inventive concepts may also be achieved by providing a portable device including a main body, and a sub body to relatively move with respect to the main body to a first position to cover a first area of the sub body and to a second position to expose the first area of the sub body, having a key unit having a first switch portion disposed in the first area to be covered by the main body in the first position, and a second switch portion extended from the first portion and disposed in a second area of the sub body which is not covered by the main body in the first position and the second position to control the first switch portion in the first position.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
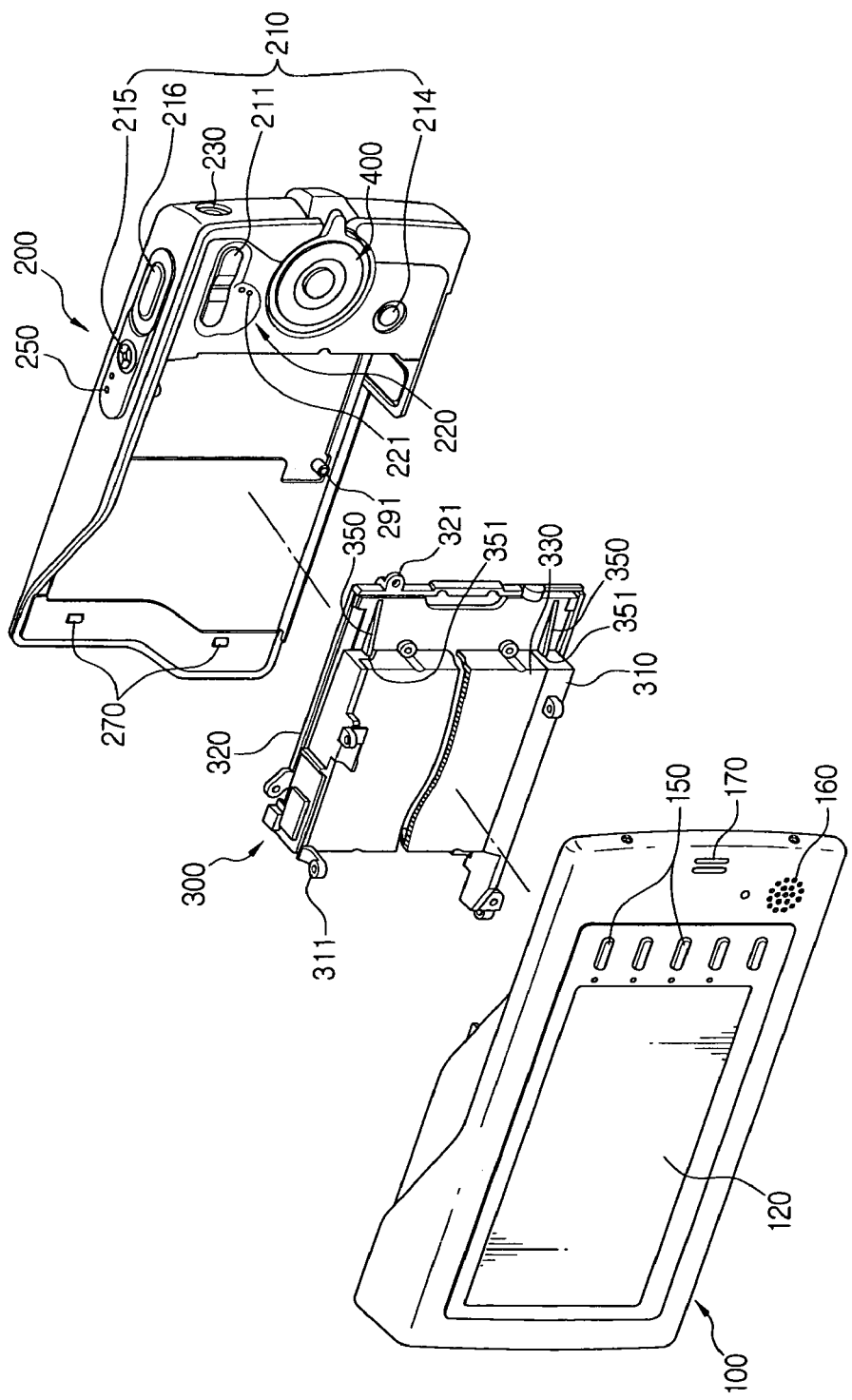
FIGS. 1A and 1B are exploded perspective views illustrating a portable device having a function key assembly according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, exemplary embodiments of the present invention will be described in detail with reference to the accompanying drawings.

Figure 1B:
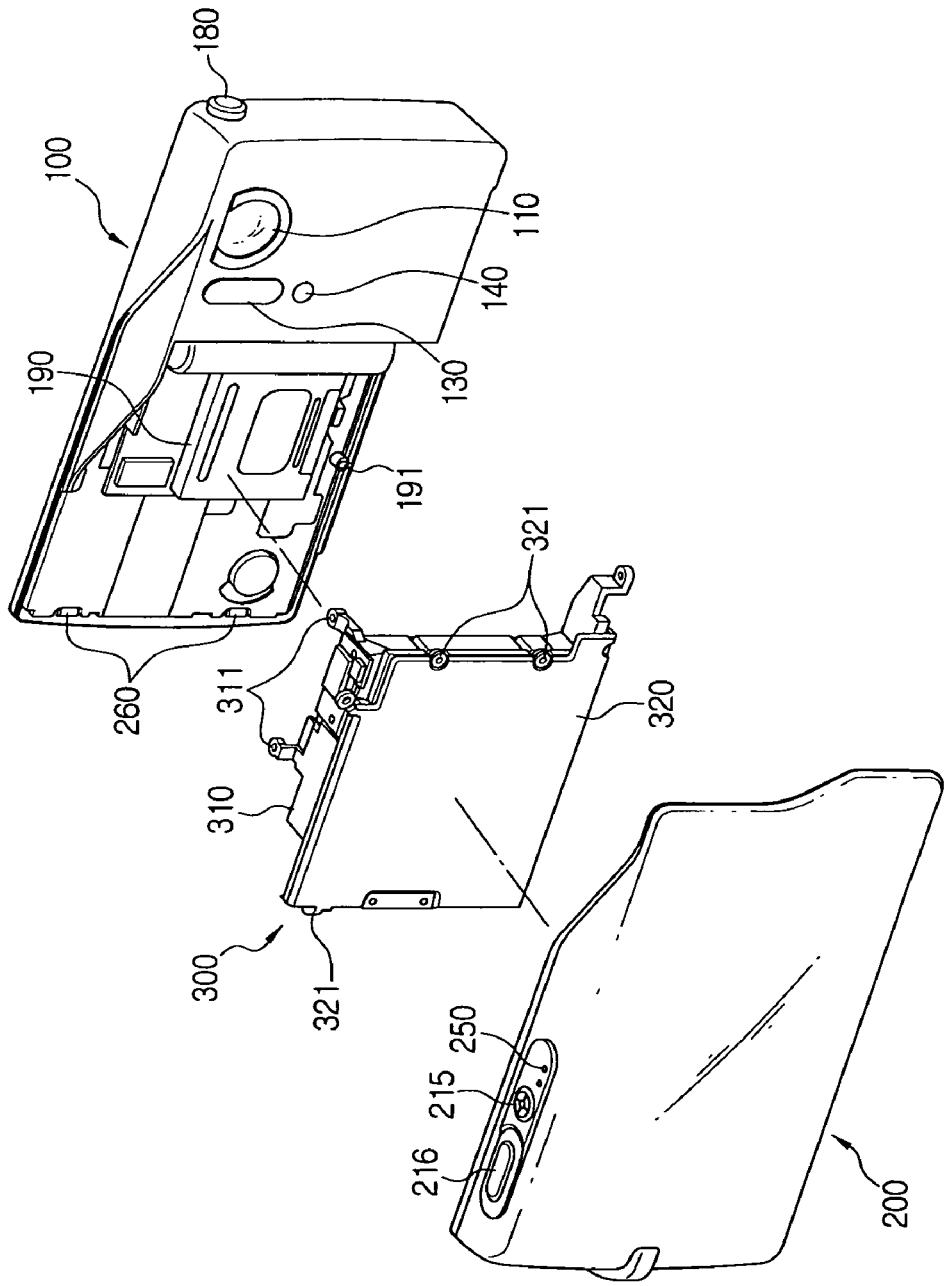

FIGS. 1A and 1B are exploded perspective views illustrating a portable device having a function key assembly according to an embodiment of the present general inventive concept. The portable device may be a portable multifunctional device having an image-taking function of a still image and a moving image, a voice recording function, an MP3 player function, a WEB camera function, and/or a digital multimedia broadcasting (DMB) reception function. The portable device includes a main body 100 and a sub body 200, wherein the main body 100 and the sub body 200 can slidably move to a first position and a second position. The main body 100 includes a lens 110 and a display screen 120. The sub body 200 includes a plurality of manipulation buttons 210 and a function key assembly 400.

Figure 2A:
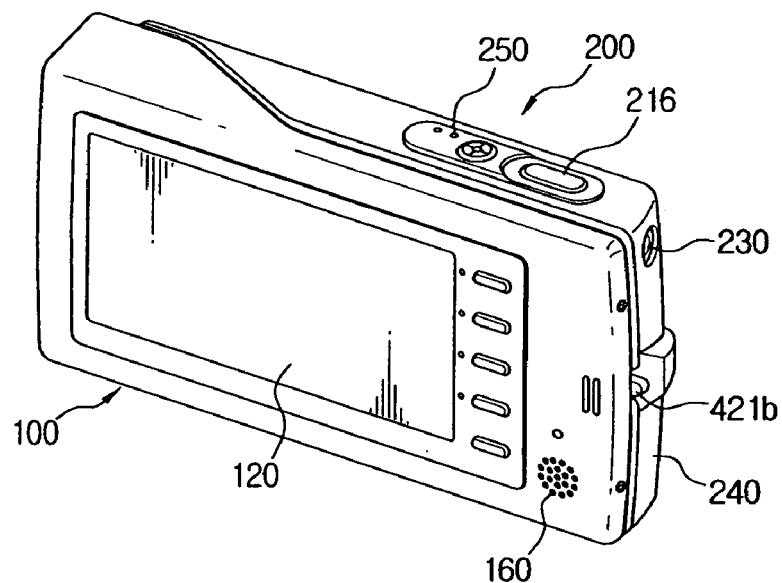
FIGS. 2A and 2B are perspective views illustrating the portable device of FIGS. 1A and 1B.
Figure 2B:
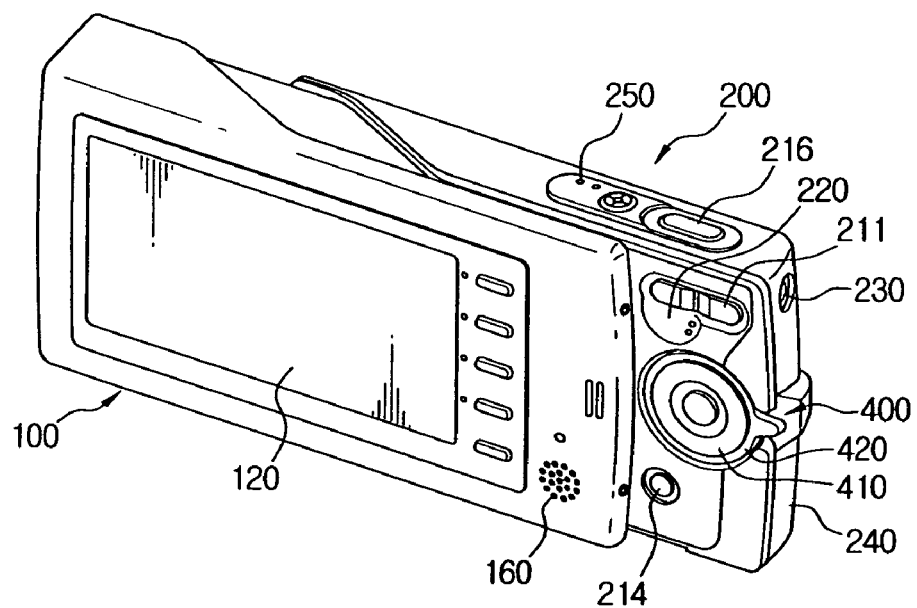

The portable device further includes a slider 300 that slidably moves a position of the sub body 200 with respect to the main body 100 to the first position and the second position. In this case, the lens 110 of the main body 100 and the manipulation buttons 210 and the function key assembly 400 of the sub body 200 are concealed in the first position (as illustrated in FIG. 2A). The lens 110 of the main body 100 and the manipulation buttons 210 the function key assembly 400 of the sub body 200 are exposed in the second position (as illustrated in FIG. 2B).

As the main body 100 and the sub body 200 slidably move to the second position, the manipulation buttons 210 of the lens 110 are exposed to take a still image and a moving image. Then, the main body 100 and the sub body 200 slidably move to the first position so that the lens 110, the manipulation button 210 and the function key assembly 400 are concealed for protection. Other additional functions in addition to the image-taking function can conveniently be used in a state that the main body 100 and the sub body 200 are slidably moved to the first position.

The main body 100 is provided with the lens 110 at one side of a rear surface to face the sub body 200 at the first position are to be exposed at the second position, and a display screen 120, such as an LCD, at a front surface. Since the main body 100 is provided with neither a grip function nor other parts such as manipulation buttons except the display screen 120, a large size of the display screen 120 can be obtained. In other words, since a general camera includes a single main body corresponding to the main body 100, a conventional display screen, a plurality of conventional manipulation buttons and a conventional grip are given to the main body, it is difficult to increase the size of the conventional display screen in the general inventive concept. However, in the present embodiment, since the manipulation buttons 210, the function key assembly 400, and the grip portion are provided in the sub body 200, the large sized display screen 120 can be obtained without increase of the whole size of the camera.

Furthermore, the main body 100 is provided with a strobo controller 130 and an LED light 140 on the rear surface, and a plurality of function buttons 150, a speaker 160, and a push button on the front surface. The function buttons 150 serve to move menus, and the push button serves to allow a user to push the push button to slide the main body 100 with respect to the sub body 200. The push button may include an anti-sliding protrusion 170. An end of an antenna 180 is exposed at a side of the main body 100. Meanwhile, main parts 190 including a main board are provided inside the main body 100.

The sub body 200 includes a grip portion exposed when the main body 100 is slid to the second position. The grip portion is provided with a grip groove 220 that receives the thumb of a user. The grip groove 220 is provided with an anti-sliding protrusion 221. Meanwhile, the manipulation buttons 210 include a zoom-in/out button 211, a menu button 214, a power button 215, a shutter 216, and function buttons 250.

The zoom-in/out button 211 and the menu button 214 are arranged in the grip portion, and the power button 215 and the shutter 216 are arranged on a top surface of the sub body 200. An AV and ear-phone jack 230 is arranged at an upper side of the sub body 200 while a DC and USB jack is arranged at a lower side of the sub body 200. The DC and USB jack is concealed by a cover 240 (see FIG. 2B) and exposed for use only by opening the cover 240.

Meanwhile, the slider 300 includes a first sliding member 310 and a second sliding member 320. The first sliding member 310 is fixed to the main body 100 and the second sliding member 320 is fixed to the sub body 200. The first and second sliding members 310 and 320 are slidably connected with each other by a guide shaft. Also, the first and second sliding members 310 and 320 are respectively provided with a plurality of clamp pieces 311 and 321. Clamps 191 and 291 corresponding to the clamp pieces 311 and 321 are respectively formed in the main body 100 and the sub body 200 so that the first and second sliding members 310 and 320 can respectively be fixed to the main body 100 and the sub body 200.

Furthermore, the slider 300 is provided with a battery chamber 330. The battery chamber 330 is provided in a space between the first and second sliding members 310 and 320. Accordingly, either the main body 100 or the sub body 200 does not require a separate space for a battery.

Meanwhile, a pair of first and second guide rollers 260 and 270 are arranged on a slid contact surface between the main body 100 and the sub body 200 to desirably perform sliding and prevent scratch from occurring on the contact surface. In other words, as illustrated in FIGS. 1A and 1B, the main body which contacts the grip portion of the sub body 200 is provided with the first guide rollers 260 while the sub body 200 which contacts a surface for the lens of the main body 100 is provided with the second guide rollers 270. The first sliding member 310 and second sliding member 320 may have a sliding element 350 and sliding groove 351 to slidably receive the sliding element 351 such that the first sliding member 310 and second sliding member 320 may slidably move with each other.

Figure 3A:
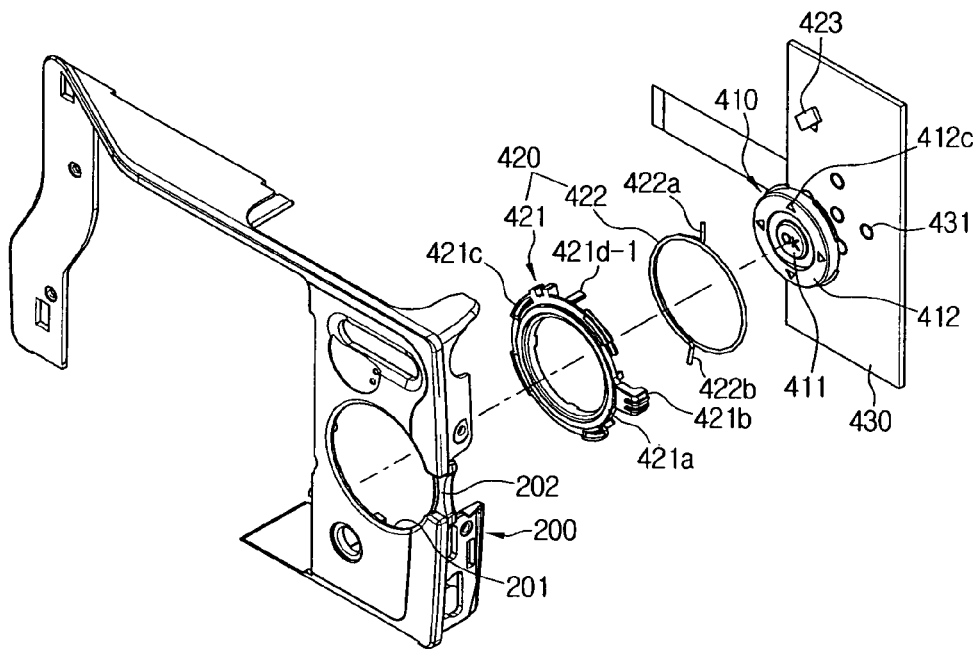
FIGS. 3A and 3B are exploded perspective views illustrating a function key assembly usable in a portable device according to an embodiment of the present general inventive concept.
Figure 3B:
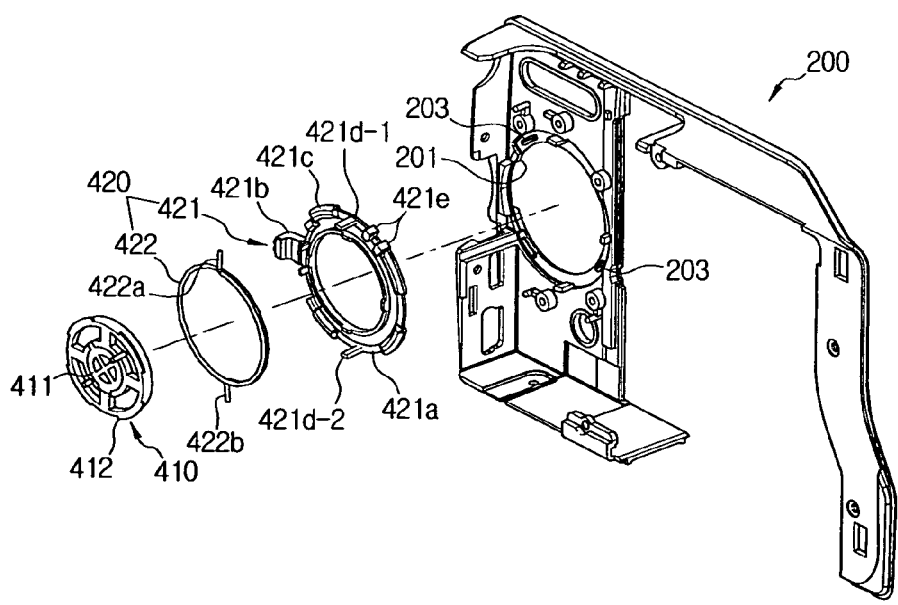
Figure 4:
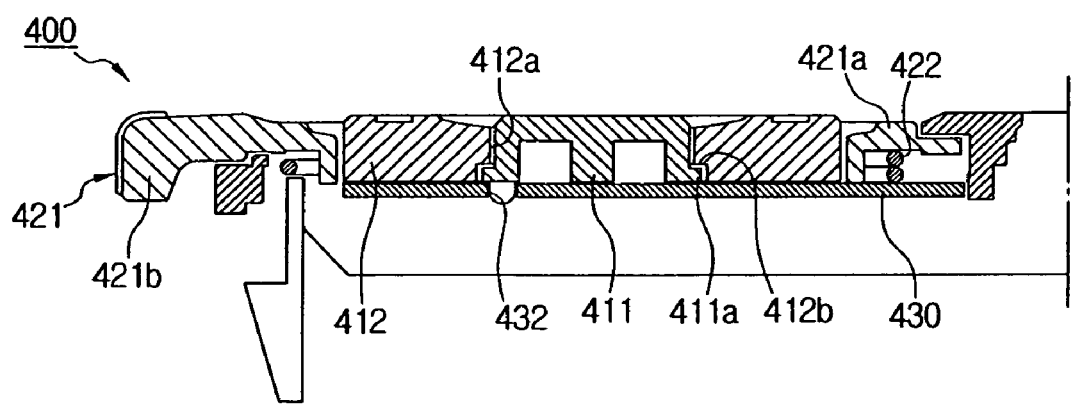
FIG. 4 is a sectional view illustrating the function key assembly of FIGS. 3A and 3B.

Referring to FIGS. 3A, 3B, and 4, the function key assembly 400 may include a direction key unit 410, a mode key unit 420, and a circuit board 430.

The direction key unit 410 includes an enter button 411 and a four directional button 412. The enter button 411 is located at a center thereof and the four directional button 412 is located around the enter button 411. The enter button 411 and the four directional button 412 may be referred to as a five directional button. The enter button 411 serves to select a menu displayed on the screen 120 or execute the selected menu. The enter button 411 is received in a hollow 412a provided at the center of the four directional button 412, and an edge 411a of the enter button 411 is hitched on an edge 412b of the four directional button 412, such that the enter button 411 is prevented from being detached from the portable device, i.e., the sub body 200. The enter button 411 is located equal to or lower than the four directional button 412 with respect to an outer side of the sub body 200.

Figure 5A:
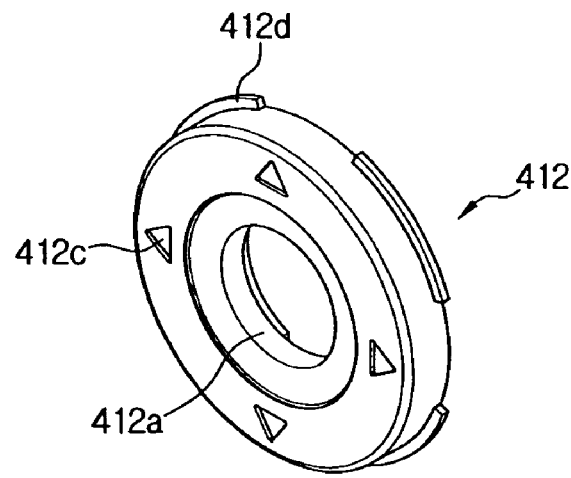
FIG. 5A is a perspective view illustrating a four directional button of the function key assembly of FIG. 3A.
Figure 5B:
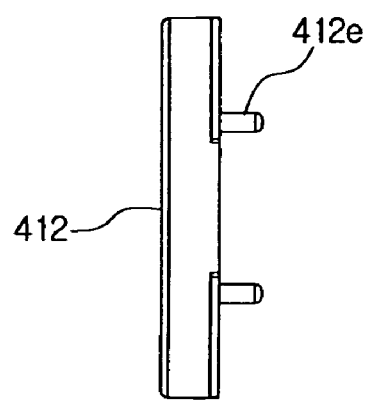
FIG. 5B is a side view illustrating the four directional button of FIG. 5A.

Referring to FIGS. 5A and 5B, the four directional button 412 has a donut shape, and is provided with a hollow 412a at the center to receive the circular shaped enter button 411. A mark 412c such as an arrow is formed on the surface of the four directional button 412 to display a push position at opposing positions. The four directional button 412 is movably supported between the mode key unit 420 and the circuit board 430 inside the sub body 200. A rib 412d is formed in a rim of the four directional button 412. The rib 412d has an outer diameter greater than a hollow h1 (FIG. 6A) so that the rib 412d can be hitched on a rim of the hollow h1 formed in a ring member 421 of the mode key unit 420. Accordingly, the four directional button 412 is prevented from being detached toward an outside thereof through the hollow h1 in a state that the four directional button 412 is movably received in the hollow h1 of the ring member 421. The four directional button 412 is supported by the circuit board 430 inside the sub body 200 along with the enter button 411 so that it cannot be detached from the mode key unit 420.

Furthermore, a plurality of positioning protrusions 412e (FIG. 5B) are protruded inside the four directional button 412. The positioning protrusions 412e are inserted into a positioning hole 432 (see FIG. 4) formed in the circuit board 430. As the relative fixing position of the four directional button 412 with respect to the circuit board 430 is determined by the positioning protrusions 412e and the positioning hole 432, the enter button 411 and the four directional button 412 can be provided to correspond to a plurality of directional switches 431 (FIG. 3A) provided in the circuit board 430. Also, the positioning protrusions 412e can prevent the four directional button 412 from being rotated.

The mode key unit 420 includes the ring member 421 and a spring 422, wherein the ring member 421 rotatably reciprocates at a predetermined angle in the sub body 200 by arranging the directional key unit 410 at the center and the spring 422 restores the ring member 421 to its original position.

Figure 6A:
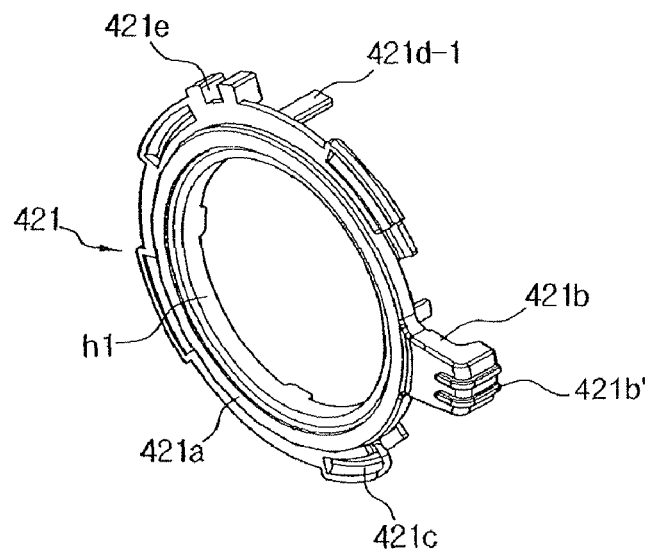
FIG. 6A is a perspective view illustrating a ring member of the function assembly of FIG. 3A.
Figure 6B:
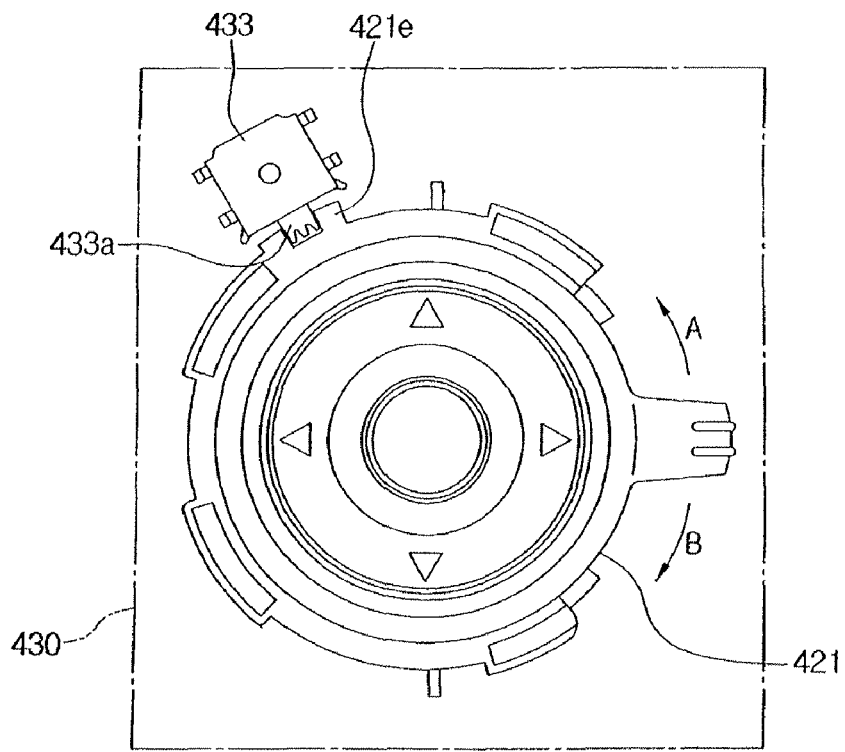
FIG. 6B is a plane view illustrating the function key assembly of FIG. 3B.

In more detail, referring to FIGS. 6A and 6B, the ring member 420 includes a donut shaped ring portion 421a, a manipulation lever 421b extended from an outer circumference of the ring portion 421a, a guide 421c provided in a rim of the ring portion 421a, and first and second protrusions 421d-1 421d-2 and a switch interference portion 421e protruded from the rim of the ring portion 421a.

The ring portion 421a has a size corresponding to a fitting hole 201 of the sub body 200 (FIGS. 3A and 3B) to be received in the fitting hole 201 formed in the sub body 200. The ring portion 421a has the hollow h1 at the center to receive the four directional button 412.

The manipulation lever 421b is extended from the outer circumference of the ring portion 421a at a predetermined length to form a single body with the ring portion 421a. Specifically, as illustrated in FIG. 2A, even in a state that the direction key unit 410 and the ring portion 421a are covered by a movement of the main body 100, the manipulation lever 421b is exposed to a side of the sub body 200 to execute its function. Accordingly, the user can select a desired mode by manipulating the manipulation lever 421b even in a state that the main body 100 is moved to the first position. To this end, a guide groove 202 (FIG. 3A) is formed around the fitting hole 201 at an outer circumference of the sub body 200 to receive the manipulating lever 421b so that the sub body 200 does not interfere with the manipulation lever 421b when the manipulation lever 421b is moved or rotates about a center thereof. Also, an anti-sliding protrusion 421b' is formed on a surface of the manipulation lever 421b.

A plurality of the guides 421c are provided on the outer circumference of the ring portion 421a at predetermined intervals. In the present embodiment, the guides 421c are guide grooves formed on an arc at a predetermined length. The guides 421c are coupled to the corresponding guide ribs 203 (see FIG. 3B) provided to correspond to a plurality of guide ribs 203 (FIG. 3) inside the sub body 200. Accordingly, the ring member 421 is guided by relative sliding motion of the guides 421c and the guide ribs 203, and its rotational angle is determined by the guides 421c and the guide ribs 203. Also, the guides 421c are hitched on an inner rim of the sub body 200 around the fitting hole 201 so that the ring member 421 can be prevented from being detached from the fitting hole 201.

The first and second protrusions 421d-1 and 421d-2 are symmetrically provided around the rotation center of the ring member 421. The protrusions 421d-1 and 421d-2 protrude on a rear surface of the ring portion 421a so that first and second ends 422a and 422b of the spring 422 are hitched thereon. One of the first and second ends 422a and 422b of the spring 422 can be hitched on one of the first and second protrusions 421d-1 and 421d-2 and then compressed. Accordingly, the ring member 421 can be restored to its original position by a restoring force of the compressed spring 422.

The switch interference portion 421e protrudes on the outer circumference of the ring portion 421a at a predetermined shape. The switch interference portion 421e, as illustrated in FIG. 6B, is provided to correspond to a mode switch 433 provided in the circuit board 430. The switch interference portion 421e is formed on the outer circumference of the ring portion 421a in a groove shape of a predetermined depth. An operation portion 433a of the mode switch 433 can be inserted into the groove shaped switch interference portion 421e. Accordingly, if the ring member 421 is moved from the state of FIG. 6B to any one direction, the operation portion 433a of the mode switch 433 interferes with the switch interference portion 421e and thus moves to one or more positions to generate one or more predetermined mode signals.

As described above, the spring 422 is to automatically restore the ring member 421 to its original position when the ring member 421 is rotated in a direction A or B to operate the mode switch 433. The spring 422 is interposed between the ring member 421 and the circuit board 430. The spring 422 has a circular shape, for example, a shape and a function similar to those of a torsion spring. The spring 422 has the first and second ends 422a and 422b bent toward an outer circumferential direction from a main body of the circular shaped spring 422. The spring 422 is arranged on the rear surface of the ring member 421 at a compressed state in a predetermined range. In a state that the spring 422 is compressed, the first and second ends 422a and 422b are respectively in the first and second protrusions 421d-1 and 421d-2 of the ring member 421.

Figure 6C:
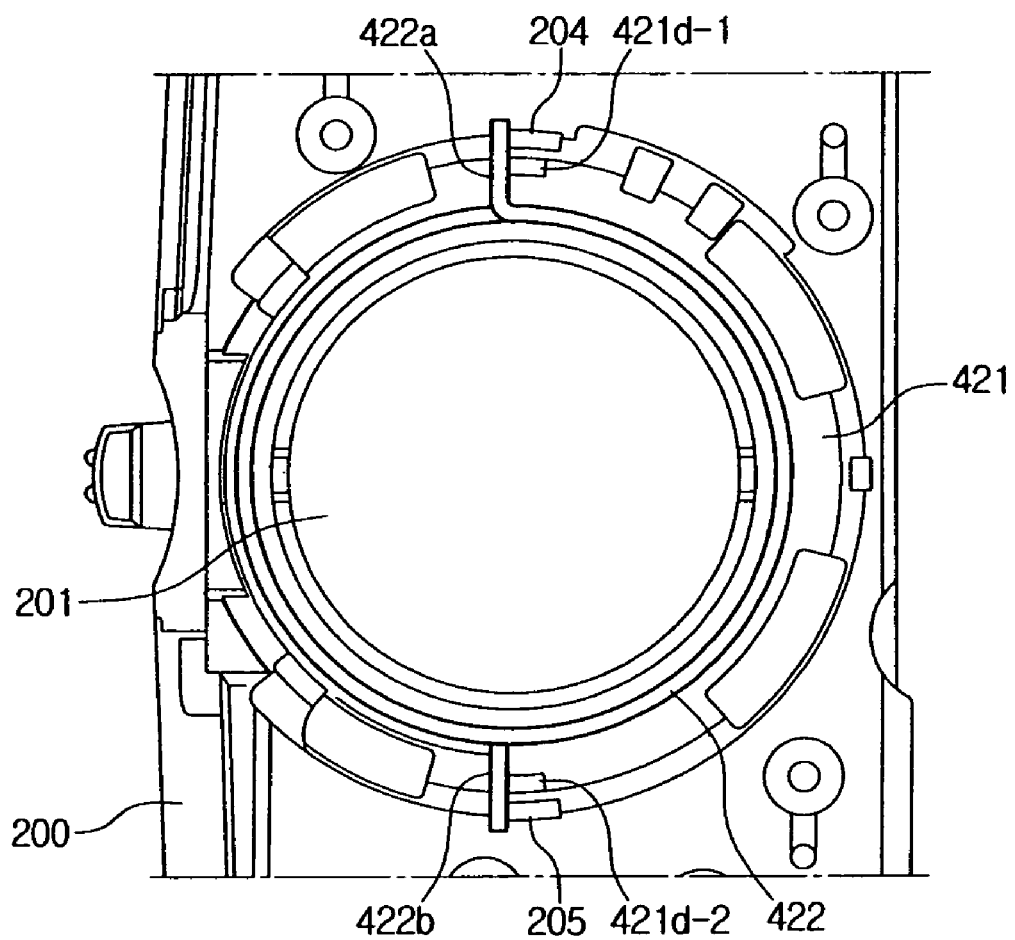
FIG. 6C is a rear view illustrating a state that the ring member of FIG. 6A is fixed to a sub body of the portable device of FIGS. 1A and 1B.

Furthermore, as illustrated in FIG. 6C, first and second edges 204 and 205 protrude around the fitting hole 201 on a rear surface of the sub body 200 to support the first and second ends 422a and 422b of the spring 422. The first and second edges 204 and 205 may support the first and second ends 422a and 422b of the spring in opposite rotation directions.

Figure 6D:
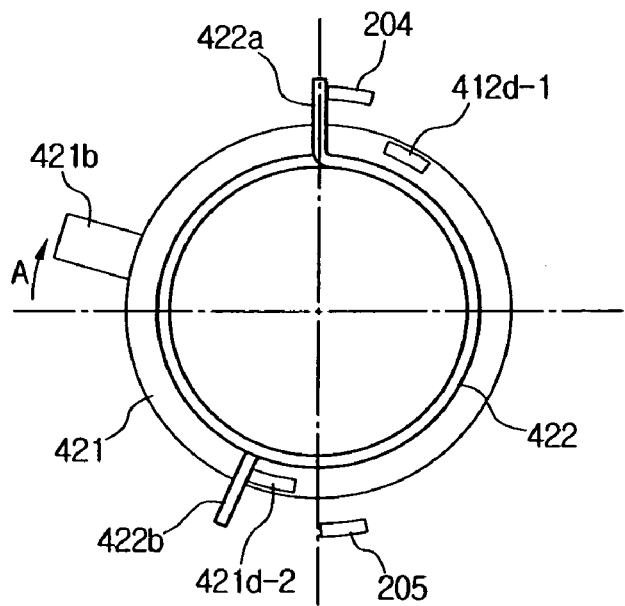
FIGS. 6D and 6E illustrate an operation state of the spring when the ring member of FIG. 6C is rotated.

As illustrated in FIG. 6D, if the ring member 421 is rotated in the direction A to operate the mode switch 433 to select a mode, the second protrusion 421d-2 pushes the second end 422b of the spring 422 to rotate together. On the other hand, the first end 422a of the spring 422 is hitched on the first edge 204 and thus does not move. Thus, the spring 422 is compressed, and if the user releases the manipulation lever 421b, the ring member 421 is restored to its original position by the restoring force of the spring 422.

Figure 6E:
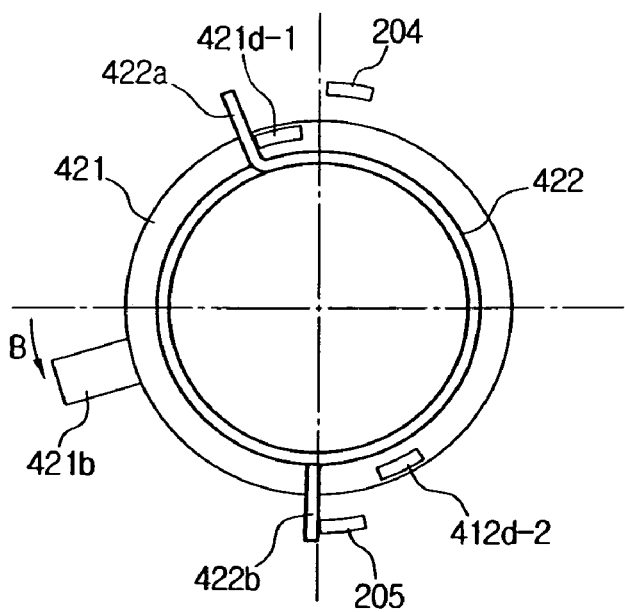

As illustrated in FIG. 6E, if the ring member 421 is rotated in the direction B to select another mode different from that of FIG. 6A, the first protrusion 421d-1 pushes the first end 422a of the spring 422 to rotate together. At this time, the second end 422b of the spring 422 is hitched on the second edge 205 and thus does not move. Thus, the spring 422 is compressed at a rotational angle of the ring member 421, and if the user releases the manipulation lever 421b, the ring member 421 is restored to its original position by the restoring force of the spring 422.

The circuit board 430 is fixed to the inner side of the sub body 200 by a screw, and is provided to support the direction key unit 410 and the mode key unit 420 so that the direction key unit 410 and the mode key unit 420 are prevented from being detached from the circuit board 430. The circuit board 430 is provided with the direction switches 431 formed in a single body, wherein the direction switches 431 generate a signal in response to a push operation of buttons 411 and 412 of the direction key unit 410. The mode switch 433 is manufactured as a separate part and then fixed onto the circuit board 430.

According to the function key assembly of the portable device described above, since the direction key unit 410, i.e., the five directional button, which is used to select or move the menu on the screen 120, and the mode key unit 420 which is used to select the mode of the portable device, are arranged at the same position, it is possible to reduce a space to install the function key assembly therein and to allow the user to easily operate the function key assembly.

Furthermore, a case of the mode key unit 420, as illustrated in FIG. 2A, since the manipulation lever 421b is exposed to the side of the device even in a state that the main body 100 is located at the first position, it is possible to allow the user to conveniently use the manipulation lever 421b to select the modes.

Furthermore, since the direction key unit 410 and the mode key unit 420 does not protrude toward the outer side of the sub body 200 but arranged at a height lower than or equal to the outer side of the sub body 200, they do not affect sliding of the main body 100. Accordingly, a gap between the main body 100 and the sub body 200 can be minimized and the whole thickness of the portable device can be reduced.

For reference, the state of FIG. 2B represents that the main body 100 is moved to the second position, such that the grip portion (grip groove) concealed by the main body 100, and the manipulation buttons 210, the direction key unit 410, and the mode key unit 420, which are provided in the grip portion, are exposed and at the same time the lens 110 covered by the sub body 200 is exposed to take an image. The user can take the image while manipulating various manipulation buttons and function keys provided in the grip portion in a state that the user safely grips the camera using the grip portion.

When the main body 100 and the sub body 200 are slid to the second position, an image-taking mode to take the image may be automatically selected. Also, the image-taking mode may be changed to other mode to perform other function.

If the user moves the main body 100 and the sub body 200 to the first position after taking the image, the lens 110 of the main body 100 and the manipulation buttons, the direction key unit 410 and the mode key unit 420 of the sub body 200 are concealed so that the camera can have a small size for allowing the user to carry it as illustrated in FIG. 2A. Since no separate grip portion is required in a case of the DMB reception function not the image-taking mode, the user can view broadcasting through the display screen in a state that the user properly grips the camera.

As described above, according to the function key assembly used in a portable device, since the function key unit and the mode key unit are arranged at the same position but can be operated independently, parts are simplified and a small sized device can be obtained.

Furthermore, since the direction key unit and the mode key unit are assembled into each other, the user can facilitate manipulation of them. Also, since the direction key unit and the mode key unit are covered with the main body which is slid, there is little limitation in designing the sliding distance of the main body.

Finally, since the mode key unit can be operated even in a state that it is covered by the main body, the user can conveniently select a desired mode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A function key assembly usable in a portable device to be exposed to an outside of the portable device having a screen to allow a user to select various functions, the function key assembly comprising:
   a direction key unit provided in the portable device, and having a plurality of buttons to select or move a menu on the screen;
   a mode key unit movably provided around the direction key unit, to allow a user to select a predetermined mode provided from the portable device according to a position motion; and
   a circuit board provided inside the portable device to prevent the direction key unit and the mode key unit from being detached therefrom, and having switches to generate signals in response to an operation of the direction key unit and the mode key unit,
   wherein the portable device comprises a main body and a sub body provided to relatively slide the main body therein to support the direction key unit and the mode key unit, the direction key unit being completely covered or exposed by the main body according to a sliding position of the main body, and the mode key unit being exposed even in a state that the direction key unit is covered the main body.

2. The function key assembly of claim 1, wherein the direction key unit comprises:
   an enter button provided in the sub body at a height corresponding to a surface of the portable device and selected by a push operation; and
   a four directional button having a hollow to arrange the enter button at the center, and provided in the portable device to allow the user to select different functions in four directions.

3. The function key assembly of claim 1, wherein the mode key unit comprises:
   a ring member to support the direction key unit to prevent the direction key unit from being detached toward the outside of the portable device, to reciprocate at a predetermined angle on the portable device around the direction key unit, and to allow the user to select a predetermined mode according to a rotation position thereof; and
   a spring having both ends provided to selectively interfere with the portable device and the ring member, and to automatically restore the ring member to an original position.

4. The function key assembly of claim 3, wherein the ring member comprises:
   a ring portion having a hollow to receive the direction key unit at a center thereof and an edge to prevent the direction key unit from being rotated;
   a manipulation lever extended from an outside of the ring portion to a side of the portable device and exposed regardless of the sliding position of a main body;
   a guide portion provided in a rim of the ring portion to guide rotation of the ring portion to restrict a rotational angle thereof; and
   a protrusion protruding from the rim of the ring portion to interfere with the both ends of the spring.

5. A portable device comprising:
   a portable device body having a screen; and
   a function key assembly exposed to an outside of the portable device body to allow a user to select various functions, the function key assembly comprising:
      a direction key unit provided in the portable device, and having a plurality of buttons to select or move a menu on the screen;
      a mode key unit movably provided around the direction key unit to select a predetermined mode provided from the portable device according to a position motion thereof; and
      a circuit board provided inside the portable device to prevent the direction key unit and the mode key unit from being detached therefrom, and having switches to generate signals in response to an operation of the direction key unit and the mode key unit,
   wherein the mode key unit comprises
      a ring member to support the direction key unit to reciprocate at a predetermined angle on the portable device body around the direction key unit, and to allow the user to select a predetermined mode according to a rotation position thereof; and a spring having both ends provided to selectively interfere with the portable device and the ring member, to automatically restore the ring member to an original position.

6. The portable device of claim 5, wherein the portable device body comprises a main body having the screen, and a sub body provided to relatively slide the main body and provided with the function key assembly.

7. The portable device of claim 5, wherein the direction key unit comprises:
an enter button provided in a sub body at a height corresponding to a surface of the portable device and selected by a push operation; and
a four directional button having a hollow to arrange the enter button at the center, and provided in the portable device to allow the user to select different functions in four directions.

8. The portable device of claim 5, wherein the mode key unit further comprises:
the ring member to prevent the direction key unit from being detached toward the outside of the portable device body.

9. The portable device of claim 5, wherein the ring member comprises:
a ring portion having a hollow to receive the direction key unit at the center and an edge to prevent the direction key unit from being rotated;
a manipulation lever extended from an outside of the ring portion to a side of the portable device and exposed regardless of the sliding position of a main body;
a guide portion provided in a rim of the ring portion to guide rotation of the ring portion to restrict a rotational angle thereof; and
a protrusion protruding from the rim of the ring portion to interfere with the both ends of the spring.

10. A functional key assembly usable in a portable device, comprising:
a direction key unit having a plurality of buttons to control a menu screen of the portable device and to be covered and exposed by a main body of the portable device; and
a mode key unit having a ring member disposed to relatively move with respect to the direction key unit to activate an external switch positioned along an outer circumference of the ring member to control a mode of the portable device, and to be covered and exposed by the main body, and a portion formed on the ring member not to be covered by the main body to control the mode of the portable device.

11. A portable device comprising:
a main body having a screen;
a sub body disposed to relatively move with respect to the main body between a first position and a second position; and
a function key assembly formed on the sub body, and having a direction key unit to control a menu displayed on the screen and to be covered in the first position and exposed in the second position, and a mode key unit having a ring member disposed to relatively move with the direction key unit to activate an external switch positioned along an outer circumference of the ring member and to be disposed covered in the first position and exposed in the second position, and a portion formed on the ring member not to be covered in the first position to control the external switch to control of a mode thereof.

12. The portable device as in claim 11, wherein the portion of the ring member is exposed in the first position and the second position.

13. The portable device as in claim 11, wherein:
the sub body comprises a guide groove recessed from a surface thereof and the portion of the ring member is disposed in the guide groove of the sub body such that the portion of the ring member is exposed.

14. The portable device as in claim 11, wherein:
the portion of the ring member is disposed on a surface of the sub body which is not covered by the main body in the first and second positions.

15. A portable device comprising:
a main body; and
a sub body to relatively move with respect to the main body to a first position to cover a first area of the sub body and to a second position to expose the first area of the sub body, having a key unit having a first switch portion disposed in the first area to be covered by the main body in the first position, and a second switch portion extended from the first portion and disposed in a second area within the sub body which is not covered by the main body in the first position and the second position to control the first switch portion in the first position.

16. The portable device as in claim 15, wherein the main body comprises a display screen, and the second switch portion of the sub body controls a mode of the display screen to display an image.

17. The portable device as in claim 16, wherein the mode of the display screen is a DMB reception mode.

* * * * *